(12) United States Patent
Nordbruch et al.

(10) Patent No.: US 9,847,027 B2
(45) Date of Patent: Dec. 19, 2017

(54) MANAGEMENT OF A PARKING LOT

(71) Applicant: Robert Bosch GmbH, Stuttgart (DE)

(72) Inventors: Stefan Nordbruch, Kornwestheim (DE); Juergen Auracher, Oberstenfeld (DE); Manuel Maier, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/184,368

(22) Filed: Jun. 16, 2016

(65) Prior Publication Data

US 2016/0371978 A1    Dec. 22, 2016

(30) Foreign Application Priority Data

Jun. 17, 2015 (DE) .................. 10 2015 211 120
Jun. 10, 2016 (DE) .................. 10 2016 210 297

(51) Int. Cl.
| | |
|---|---|
| G08G 1/14 | (2006.01) |
| G06K 9/00 | (2006.01) |
| G06T 7/00 | (2017.01) |
| G08G 1/01 | (2006.01) |
| G08G 1/04 | (2006.01) |
| G08G 1/065 | (2006.01) |

(52) U.S. Cl.
CPC ......... *G08G 1/146* (2013.01); *G06K 9/00785* (2013.01); *G06T 7/00* (2013.01); *G08G 1/0116* (2013.01); *G08G 1/04* (2013.01); *G08G 1/065* (2013.01); *G08G 1/14* (2013.01); *G08G 1/141* (2013.01); *G08G 1/142* (2013.01); *G08G 1/145* (2013.01)

(58) Field of Classification Search
CPC .......... G08G 1/065; G08G 1/14; G08G 1/141; G08G 1/142; G08G 1/145
See application file for complete search history.

(56) References Cited

U.S. PATENT DOCUMENTS

| | | | |
|---|---|---|---|
| 5,432,508 A * | 7/1995 | Jackson .................... | E04H 6/42 340/932.2 |
| 6,426,708 B1 | 7/2002 | Trajkovic et al. | |
| 8,825,353 B2 | 9/2014 | Mori et al. | |
| 2009/0088959 A1 | 4/2009 | Mori et al. | |
| 2011/0063132 A1* | 3/2011 | Trum ................. | G01C 21/3476 340/932.2 |
| 2014/0062726 A1 | 3/2014 | Aivas et al. | |
| 2015/0170518 A1* | 6/2015 | Rodriguez Garza .. | G08G 1/144 340/932.2 |
| 2016/0266804 A1 | 9/2016 | Shimizu | |

FOREIGN PATENT DOCUMENTS

| | | |
|---|---|---|
| JP | 2004295783 A | 10/2004 |
| WO | 2013105067 A1 | 7/2013 |

* cited by examiner

*Primary Examiner* — Andrew Bee
(74) *Attorney, Agent, or Firm* — Norton Rose Fulbright US LLP; Gerard Messina

(57) ABSTRACT

A parking lot is designed for parking motor vehicles in a non-organized manner. A method for managing the parking lot includes steps of determining an area P of the parking lot that is able to be occupied by parked motor vehicles, of determining an area K of the parking lot that is currently occupied by parked motor vehicles, and of determining a number Z of motor vehicles that may be parked additionally in the parking lot, on the basis of the relationship $Z=(1-K/P)*M$, where M comprises a maximum number of motor vehicles that may be parked in the parking lot.

17 Claims, 1 Drawing Sheet

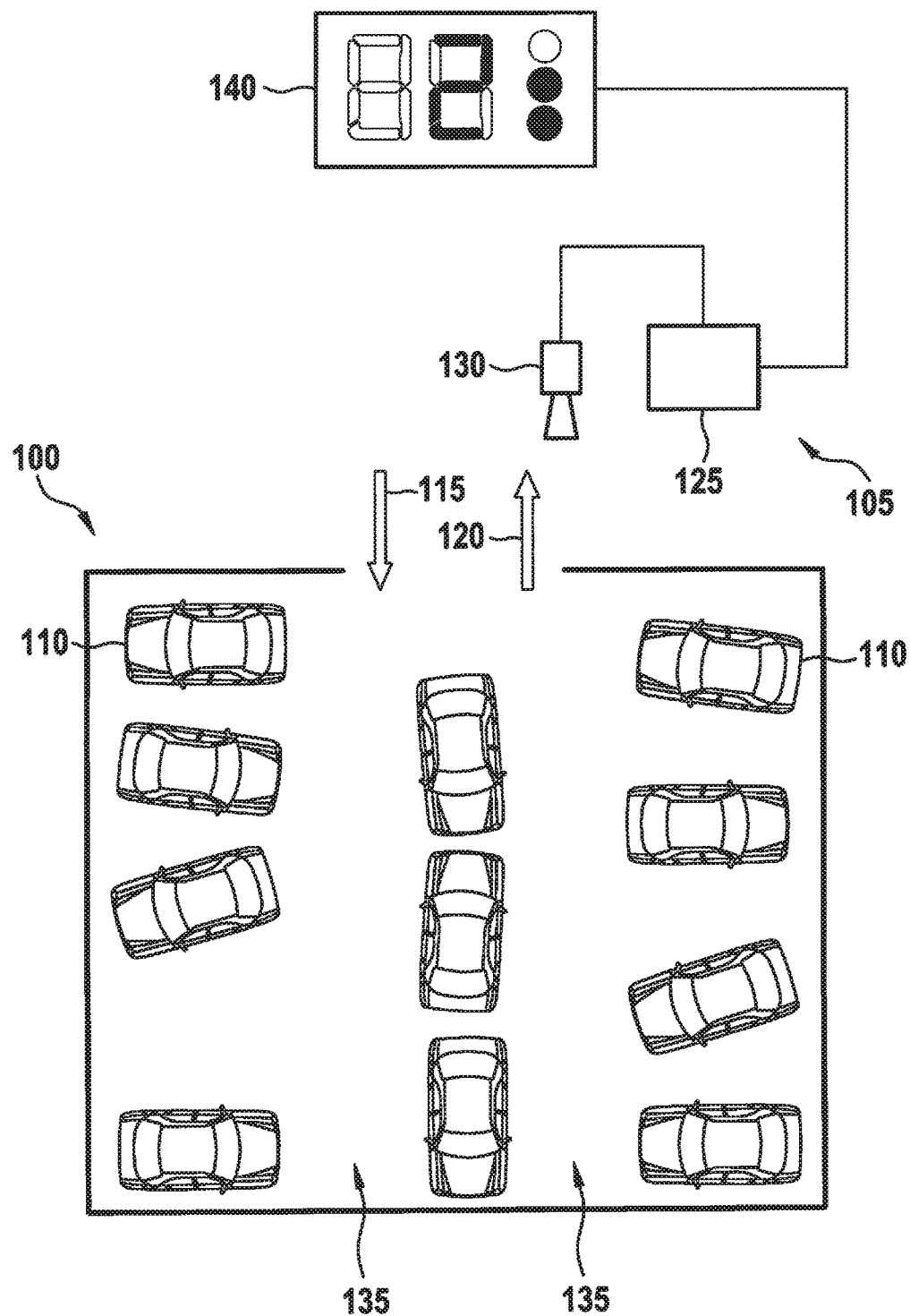

MANAGEMENT OF A PARKING LOT

CROSS REFERENCE

The present application claims the benefit under 35 U.S.C. §119 of German Patent Application Nos. DE 102015211120.2 filed on Jun. 17, 2015, and DE 102016210297.4 filed on Jun. 10, 2016, which are expressly incorporated herein by reference in their entirety.

FIELD

The present invention relates to the management of a parking lot that is designed for parking motor vehicles.

BACKGROUND INFORMATION

A parking lot is designed to accommodate a number of motor vehicles that may be parked within it. In this instance, there is no concrete prescription as to the manner or the order in which the motor vehicles are to be parked in the parking lot. An arrangement of motor vehicles in the parking lot may therefore change.

In contrast to an organized parking lot, in which parking spaces are identified that may be respectively occupied by a motor vehicle, it is difficult to manage a non-organized parking lot. In particular, it may be difficult to determine a number of the motor vehicles that at a given time may be additionally parked in the parking lot.

The present invention is based on the objective of providing a technology for managing a parking lot that is designed for parking motor vehicles.

SUMMARY

A parking lot is designed for parking motor vehicles. A method for managing the parking lot includes steps of determining an area P of the parking lot that is able to be occupied by parked motor vehicles, of determining an area K of the parking lot that is currently occupied by parked motor vehicles, and of determining a number Z of motor vehicles that may be parked additionally in the parking lot, on the basis of the relationship $Z=(1-K/P)*M$, where M comprises a maximum number of motor vehicles that may be parked in the parking lot.

Thus it is possible to determine in a simple and robust manner how large the remaining accommodation capacity of the parking lot is. The specific value may be indicated for example on a display board outside of the parking lot.

It is in particular preferred that the parking lot is designed for parking motor vehicles in a non-organized manner. In this context, usually no demarcations of parking spaces are provided for individual motor vehicles. Drivers may park their motor vehicles in practically any manner in the parking lot, it being preferably assumed that they themselves will take care that no other motor vehicle is thereby impeded.

M is preferably verified at regular intervals on the basis of a count of the motor vehicles parked in the fully occupied parking lot. The count may be carried out in particular manually. For this purpose, it is not necessary that a person walk through the parking lot in order to count the motor vehicles; rather, the count may be performed on the basis of a scanning result in the form of an image. It is thus possible to verify or calibrate the method in a simple and cost-effective manner.

M may be determined on the basis of an average value of multiple counts performed at intervals. The robustness or precision of the method may thus be increased.

In one specific embodiment, P is determined anew at regular intervals. This makes it possible to take influences into account that make a part of the parking lot unusable such as for example a construction site or a section that is blocked off for weather-related reasons.

When determining P, the area of traffic paths through the parking lot, which are not available for parking motor vehicles, may be excluded. For this purpose, the traffic paths may be detected or assumed automatically on the basis of a scanning result that is available as an image. It is thus possible nevertheless to take into account the organizational structure of motor vehicles in the parking lot that is otherwise difficult to predict.

The specific number Z of motor vehicle that may be parked additionally may be published in real time. In particular, the number Z may be made accessible in a cloud or a web service. In one specific embodiment, it is also possible to publish an occupancy map of the parking lot. The occupancy map may be determined on the basis of the scanning result or may correspond to it.

Moreover, it is possible to determine a reliability of the determination of the number of motor vehicles that may be parked additionally. The determined reliability may be published together with the determined number Z in order to offer a driver, who is looking for a free parking space for his motor vehicle, an improved basis for a decision.

A computer program product includes program code means for carrying out the method described above when the computer program product is run on a processing device or is stored on a computer-readable data carrier.

A device for managing the above-described parking lot includes a scanning device for determining an area K of the parking lot that is currently occupied by parked motor vehicles and a processing device that is designed to determine a number Z of motor vehicles that may be additionally parked in the parking lot, on the basis of the relationship $Z=(1-K/P)*M$. In this instance, P comprises the area P of the parking lot that may be occupied by parked motor vehicles, and M comprises a maximum number of motor vehicles that may be parked in the parking lot.

The scanning device preferably includes an imaging sensor.

This makes it possible to detect or evaluate the scanning result easily both by a machine as well as by a person. For machine-processing, algorithms for image detection are known. In another specific embodiment, other sensors may be used as well, for example radar or lidar, which alternatively may be imaging or non-imaging. It is also possible to use a combination of one or multiple imaging sensors and one or multiple non-imaging sensors.

BRIEF DESCRIPTION OF THE DRAWINGS

The present invention is described in more detail with reference to the FIGURE.

FIG. 1 shows a parking lot having a management device.

DETAILED DESCRIPTION OF EXAMPLE EMBODIMENTS

FIG. 1 shows a parking lot 100 having a management device 105. Parking lot 100 is designed for non-organized parking, that is, it is not or is not precisely prescribed for individual motor vehicles 110, which may be parked in parking lot 100, how the motor vehicles 110 are to be arranged. In particular, the width or length of a parking space that a motor vehicle 110 may occupy may be undefined. Also a pattern, according to which rows or other arrangements of motor vehicles 110 are formed in the parking lot 100, may be freely selectable as well. In this context, each driver of a motor vehicle 110 may contribute toward forming an organizational structure.

Parking lot 100 may include an entrance 115 and an exit 120. In the present representation, both coincide physically; but they may also be provided as separate of each other. Furthermore, multiple entrances 115 or multiple exits 120 may be provided.

Management device 105 is designed to determine a number of motor vehicles that at a given point in time may be parked additionally in parking lot 100. For this purpose, management device 105 includes a processing device 125, which is connected to a scanning device 130. Scanning device 130 may operate for example using radar, lidar, ultrasound, visible or invisible light.

Scanning device 130 is preferably imaging, that is, it is designed to provide a two- or three-dimensional representation of parking lot 100. The representation comprises a plurality of image elements, whose values represent portions of parking lot 100 or of a motor vehicle 110. It is preferred that scanning device 130 is mounted at an elevation above parking lot 100 in order to perform the scan from the bird's eye view. Scanning device 130 may be mounted on an elevated part of a building, a post or a pillar, for example. This is a good option particularly in the case a parking lot 100 that is in the open, but the technology described may in principle also be used in the case of a parking lot that is covered and that is part of a parking garage or an underground parking facility, for example. In one specific embodiment, multiple scanning devices 130 may be provided, the data of which may be combined by processing device 125 in order to provide a complete picture of parking lot 100 with the motor vehicles 110 parked in it.

On the basis of the image or the representation of parking lot 100 with parked motor vehicles 110 provided by processing device 125, it is possible to determine an area K of the parking lot that is currently occupied by motor vehicles 110. With the knowledge of the total area P of parking lot 100, it is possible to determine the degree to which parking lot 100 is filled as Q=K/P. If this quotient Q is multiplied by the maximum number M of motor vehicles 110 that may be parked in parking lot 100, then this yields the number Z of motor vehicles 110 that may currently still be parked. As a formula, this may be represented as follows:

$$Z=(1-Q)*M=(1-K/P)*M.$$

The area P of parking lot 100, which is able to be occupied by parked motor vehicles 110, preferably does not include traffic paths 135 that are not available for parking motor vehicles 110. Traffic paths 135 are generally required in order to allow every parked motor vehicle to reach exit 120. Preferably, sufficient traffic paths 135 are also provided in order for a motor vehicle 110, starting from the entrance, to reach a free area of parking lot 100 that is usable as a parking space for a motor vehicle 110.

The location of a traffic path 135 in parking lot 100 may change over time, for example when the organizational principle of motor vehicles 110 changes. In FIG. 1, motor vehicles 110 are arranged in columns by way of example; although at another point in time an arrangement in rows may come about as well for example. Traffic paths 135 would then have to be oriented differently than in the representation, namely, horizontally instead of vertically.

The area P of the parking lot usable for parking motor vehicles 110 may change over time, for example if a section of parking lot 100 cannot be reached by a motor vehicle 110 from entrance 115, for example if in winter a section of parking lot 100 is occupied by a pile of snow or if a section of parking lot 100 cannot be used in a strong rain fall due to water accumulation. It is preferred that the area P is determined by processing device 125 on the basis of the representation provided by scanning device 130. The frequency of the determination may be equal to or lower than the frequency of determination of Z, i.e., of motor vehicles 110 that may be parked additionally in parking lot 100. Preferably, for each determination of Z, at least one scan is performed by scanning device 130. Z may be determined periodically, for example monthly or every quarter of an hour. The determination may also be event-driven, for example if a request is received from a driver who is looking for a parking space for his motor vehicle 110. The request may be sent from a smart phone or from a computer installed in motor vehicle 110, for example, a wireless data transmission being preferred for this purpose.

The specific number Z of motor vehicles 110 that may be parked additionally in parking lot 110 may be represented graphically or numerically via a display board 140. Alternatively or additionally, the specific number Z may also be published digitally, for example as a web service or in a cloud.

How well the determined number of motor vehicles 110 that may be parked additionally in parking lot 100 matches the actual motor vehicles 110 that may still be parked in parking lot 100 usually depends on a degree to which parking lot 100 is filled. This degree of usage corresponds to the quotient Q mentioned above. In the exemplary representation of FIG. 1, two additional motor vehicles 110 were determined that are able to find room in parking lot 100. In the row of parked motor vehicles 110 in the left area of parking lot 100 of FIG. 1, there is a corresponding space that could be occupied by another motor vehicle 110. On the right side, by contrast, no space is formed since adjacent motor vehicles 110 of this row are spaced too far apart from one another. The determined number Z therefore deviates by 1 from the actual number of motor vehicles 110 that may still be accommodated in the parking lot. This corresponds to an absolute error of only 1, but to a relative error of 50%.

The lower the degree Q to which parking lot 100 is filled, the more probable it is that a sufficiently small motor vehicle 110 may still be found that is able to utilize a remaining area that is smaller than the average area required by a motor vehicle 110. If the degree to which parking lot 100 is filled approaches 100%, however, then the possibilities of tight parking are nearly exhausted.

It is possible to determine a reliability or confidence with which the determined number of motor vehicles 110 that may still be parked in parking lot 100 is correct. In another specific embodiment, it is also possible to determine a probability of the applicability of the determined number. This value may be provided together with the determined number of motor vehicles 110 that may be additionally parked. The representation of FIG. 1 shows on display board 140 on the right side an exemplary traffic light-like structure that indicates degree of reliability of the determined displayed value. As an alternative to the symbolic representation, a graphic representation may also be used.

What is claimed is:

1. A method for managing a parking lot for parking motor vehicles, the method comprising:
   capturing, using a scanning device, at least one image of a parking lot for parking motor vehicles in a non-organized manner;
   determining, using a processing device, an area P of the parking lot, which may be occupied by parked motor vehicles, based on the captured at least one image of the parking lot;
   determining, using the processing device, an area K of the parking lot, which is currently occupied by parked motor vehicles, based on the captured at least one image of the parking lot;
   determining, using the processing device, a number Z of motor vehicles, which may be parked additionally in the parking lot, on the basis of a relationship $Z=(1-K/P)*M$, where M comprises a maximum number of motor vehicles that may be parked in the parking lot; and
   at least one of: displaying the determined number Z of motor vehicles that may be parked additionally using a display device, or publishing the determined number Z of motor vehicles that may be parked additionally using a publishing device.

2. The method as recited in claim 1, wherein M is verified at regular intervals based on a count of the vehicles parked in the parking lot when the parking lot is fully occupied.

3. The method as recited in claim 2, wherein M is determined based on an average value of multiple counts performed at the regular intervals.

4. The method as recited in claim 1, wherein P is determined anew at regular intervals.

5. The method as recited in claim 1, wherein in the determination of P, an area of traffic paths in the parking lot which are not available for parking motor vehicles is excluded.

6. The method as recited in claim 1, wherein the determined number Z of motor vehicle that may be parked additionally is published in real time.

7. The method as recited in claim 1, wherein a reliability of the determination of the number Z of motor vehicles that may be additionally parked is determined.

8. A non-transitory computer-readable data carrier storing program instructions, which when executed by a processing device cause the processing device to perform a method for managing a parking lot for parking motor vehicles, the method comprising:
   capturing, using a scanning device, at least one image of a parking lot for parking motor vehicles in a non-organized manner;
   determining an area P of the parking lot, which may be occupied by parked motor vehicles, based on the captured at least one image of the parking lot;
   determining an area K of the parking lot, which is currently occupied by parked motor vehicles, based on the captured at least one image of the parking lot;
   determining a number Z of motor vehicles, which may be parked additionally in the parking lot, on the basis of the relationship $Z=(1-K/P)*M$, where M comprises a maximum number of motor vehicles that may be parked in the parking lot; and
   at least one of: displaying the determined number Z of motor vehicles that may be parked additionally using a display device, or publishing the determined number Z of motor vehicles that may be parked additionally using a publishing device.

9. A system for managing a parking lot for parking motor vehicles, the system comprising:
   a scanning device to capture at least one image of a parking lot for parking motor vehicles in a non-organized manner;
   a processing device to:
      determine an area P of the parking lot, which may be occupied by parked motor vehicles, based on the captured at least one image of the parking lot;
      determine an area K of the parking lot, which is currently occupied by parked motor vehicles, based on the captured at least one image of the parking lot;
      determine a number Z of motor vehicles which may be parked additionally in the parking lot, on the basis of a relationship $Z=(1-K/P)*M$, wherein M comprises a maximum number of motor vehicles that may be parked in the parking lot; and
   at least one of: a display device to display the determined number Z of motor vehicles that may be parked additionally, or a publishing device to publish the determined number Z of motor vehicles that may be parked additionally.

10. The device as recited in claim 9, wherein the scanning device includes an imaging sensor.

11. The method as recited in claim 1, wherein the determining of the area P is performed at a first frequency, and the determining of the number Z is performed at a second frequency equal to or greater than the first frequency.

12. The method as recited in claim 1, further comprising detecting, using the processing device, an area of traffic paths in the parking lot which are not available for parking motor vehicles, wherein in the determination of P, the area of traffic paths in the parking lot which are not available for parking motor vehicles is excluded.

13. The method as recited in claim 1, wherein the scanning device captures the image using an imaging sensor.

14. The method as recited in claim 1, wherein the scanning device captures the image using radar.

15. The method as recited in claim 1, wherein the scanning device captures the image using lidar.

16. The method as recited in claim 1, wherein the capturing captures a plurality of images using a plurality of a scanning devices.

17. The method as recited in claim 16, further comprising combining, by the processing device, the plurality of images.

* * * * *